US012498340B2

United States Patent
Wang et al.

(10) Patent No.: US 12,498,340 B2
(45) Date of Patent: Dec. 16, 2025

(54) RESISTIVITY CONTROL OF COATED GLASS UNITS FOR UNIFORMITY IMPROVEMENT

(71) Applicant: SAGE Electrochromics, Inc., Faribault, MN (US)

(72) Inventors: Yan Wang, Lakeville, MN (US); Frank McGrogan, Faribault, MN (US); Bolei Di, Woodbury, MN (US); Yigang Wang, Maple Grove, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 195 days.

(21) Appl. No.: 18/340,474

(22) Filed: Jun. 23, 2023

(65) Prior Publication Data

US 2024/0003840 A1    Jan. 4, 2024

Related U.S. Application Data

(60) Provisional application No. 63/367,312, filed on Jun. 29, 2022.

(51) Int. Cl.
*G01N 27/04* (2006.01)
*C23C 14/34* (2006.01)
(Continued)

(52) U.S. Cl.
CPC ........... *G01N 27/041* (2013.01); *C23C 14/34* (2013.01); *E06B 9/24* (2013.01); *G02F 1/13439* (2013.01);
(Continued)

(58) Field of Classification Search
CPC ......... G01N 27/041; C23C 14/34; E06B 9/24; G02F 1/13439; G02F 1/155
See application file for complete search history.

(56) References Cited

U.S. PATENT DOCUMENTS

2011/0051221 A1    3/2011  Veerasamy
2014/0332371 A1   11/2014  Demaray
(Continued)

FOREIGN PATENT DOCUMENTS

| CN | 103370649 A | * | 10/2013 | ........... G02F 1/1503 |
| WO | 2013049379 A1 | | 4/2013 | |
| WO | WO-2016100403 A1 | * | 6/2016 | ............. G02F 1/153 |

OTHER PUBLICATIONS

International Search Report and Written Opinion mailed Oct. 18, 2023 in PCT/US2023/069294, Sage Electrochromics, Inc., pp. 1-11.
(Continued)

*Primary Examiner* — Christopher E Mahoney
(74) *Attorney, Agent, or Firm* — Robert C. Kowert; Kowert, Hood, Munyon, Rankin & Goetzel, P.C.

(57) ABSTRACT

A method implemented by a system for manufacturing a device having a coated transparent substrate is provided. The method includes providing the device having a transparent substrate. The method also includes coating the transparent substrate with a first transparent conductive oxide (TCO) layer in accordance with one or more parameters. The coating the transparent substrate comprises performing a physical deposition process on the transparent substrate. The method further includes determining a resistance across the first TCO layer. In addition, the method includes determining whether the resistance across the first TCO layer is within a resistance range. The method also includes in response to determining that the resistance across the first TCO layer is within the resistance range, coating the device with a second TCO layer in accordance with the one or more parameters to provide a resistance across the second TCO layer that is within the resistance range.

20 Claims, 10 Drawing Sheets

(51) Int. Cl.
 *E06B 9/24* (2006.01)
 *G02F 1/1343* (2006.01)
 *G02F 1/155* (2006.01)
 *H01J 37/34* (2006.01)

(52) U.S. Cl.
 CPC ...... *G02F 1/155* (2013.01); *E06B 2009/2464* (2013.01); *H01J 37/3405* (2013.01)

(56) References Cited

U.S. PATENT DOCUMENTS

| | | |
|---|---|---|
| 2018/0081250 A1 | 3/2018 | Kailasam et al. |
| 2018/0197388 A1* | 7/2018 | Droste .................. G08B 13/04 |
| 2021/0088867 A1 | 3/2021 | Nagel et al. |

OTHER PUBLICATIONS

Radhouane Bel Hadj Tahar, et al., "Tin doped idium oxide thin films: Electrical properties", Journal of Applied Physics, vol. 83, No. 5, Mar. 1, 1998, pp. 1-15.
Minami et al., (1997), "Physics of very thin ITO conducting films with high transparency prepared by DC magnetron sputtering", Thin Solid Films, vol. 308-309, Oct. 1997, URL: https://www.sciencedirect.com/science/article/abs/pii/S0040609097005300, pp. 13-18.
Serenyi, M., et al., "Refractive index of sputtered silicon oxynitride layers for antireflection coating", Vacuum, 61, Issue 2-4, May 14, 2001, URL: https://www.sciencedirect.com/science/article/abs/pii/S0042207X01001245, pp. 245-249.

* cited by examiner

RESISTIVITY CONTROL OF COATED GLASS UNITS FOR UNIFORMITY IMPROVEMENT

PRIORITY CLAIMS

This application claims benefit of priority to U.S. Provisional Application Ser. No. 63/367,312, entitled "Resistivity Control of Coated Glass Units for Uniformity Improvement," filed Jun. 29, 2022, and which is hereby incorporated herein by reference in its entirety.

FIELD OF THE DISCLOSURE

The present disclosure is directed to electrochromic devices, and more specifically to various approaches to improve tint uniformity through controlling resistivity through conductive layers.

BACKGROUND

An electrochromic device (e.g., one that includes electrically switchable or electrochromic glass) may help to block the transmission of visible light into a building or passenger compartment of a vehicle. Electrochromic devices include electrochromic materials that are known to change their optical properties, such as coloration, in response to the application of an electrical potential, thereby making the device more or less transparent or more or less reflective. For instance, an electrochromic (EC) device can change its optical properties such as optical transmission, absorption, reflectance and/or emittance in a continual but reversible manner on application of voltage. This property enables the EC device to be used for applications like smart glasses, electrochromic mirrors, and electrochromic display devices. Electrochromic glass may include a type of glass or glazing for which light transmission properties of the glass or glazing are altered when electrical power (e.g., voltage/current) is applied to the glass. Electrochromic materials may change in opacity (e.g., may changes levels of tinting) when electrical power is applied.

Typical electrochromic ("EC") devices generally include a counter electrode layer ("CE layer"), an electrochromic material layer ("EC layer") which is deposited substantially parallel to the counter electrode layer, and an ionically conductive layer ("IC layer) separating the counter electrode layer from the electrochromic layer, respectively. In addition, two transparent conductive (TC) layers (e.g., two transparent conductive oxide layers) respectively may be substantially parallel to and in contact with the CE layer and the EC layer. The EC layer, IC layer, and CE layer can be referred to collectively as an EC stack, EC thin film stack, etc.

When an electric potential is applied across the layered structure of the electrochromic device, such as by connecting the respective TC, or TCO, layers to a low voltage electrical source, ions, which can include Li+ ions stored in the CE layer, flow from the CE layer, through the IC layer and to the EC layer. In addition, electrons flow from the CE layer, around an external circuit including a low voltage electrical source, to the EC layer so as to maintain charge neutrality in the CE layer and the EC layer. The transfer of ions and electrons to the EC layer causes the optical characteristics of the EC layer, and optionally the CE layer in a complementary EC device, to change, thereby changing the coloration and, thus, the transparency of the electrochromic device. In some aspects, electric current flowing through the top and bottom transparent conductive oxide (TCO) layers may cause a voltage drop and varying local voltage may result in non-uniform in-plane appearance in electrochromic devices. The non-uniformity may become worse when the top and bottom TCO layers are of different sheet resistances.

SUMMARY

In some aspects, electric current flowing through the top and bottom transparent conductive oxide (TCO) layers may cause a voltage drop and varying local voltage may result in non-uniform in-plane appearance in electrochromic devices. The non-uniformity may become worse when the top and bottom TCO layers are of different sheet resistances. To limit non-uniformity, sheet resistance differences between two or more sheets may be maintain below a threshold resistance difference. In some aspects, transversal leakage current concentrated at edges of electrochromic devices may provide a lop-sided voltage distribution creating a non-uniform tinting appearance. Such leakage may occur due to natural process/materials variation or special processing at edges such as ablation, selective etching, passivation, laser scribes, lamination, or the like. Non-uniformity may increase when edge leakage increases. To limit non-uniformity, edge leakage may be controlled, for example, in order to have less than a 0.6V local voltage difference at glare control holding states and/or edge leakage should be less than 25% of the max allowed leakage current defined by a performance specifications.

Figure 1:
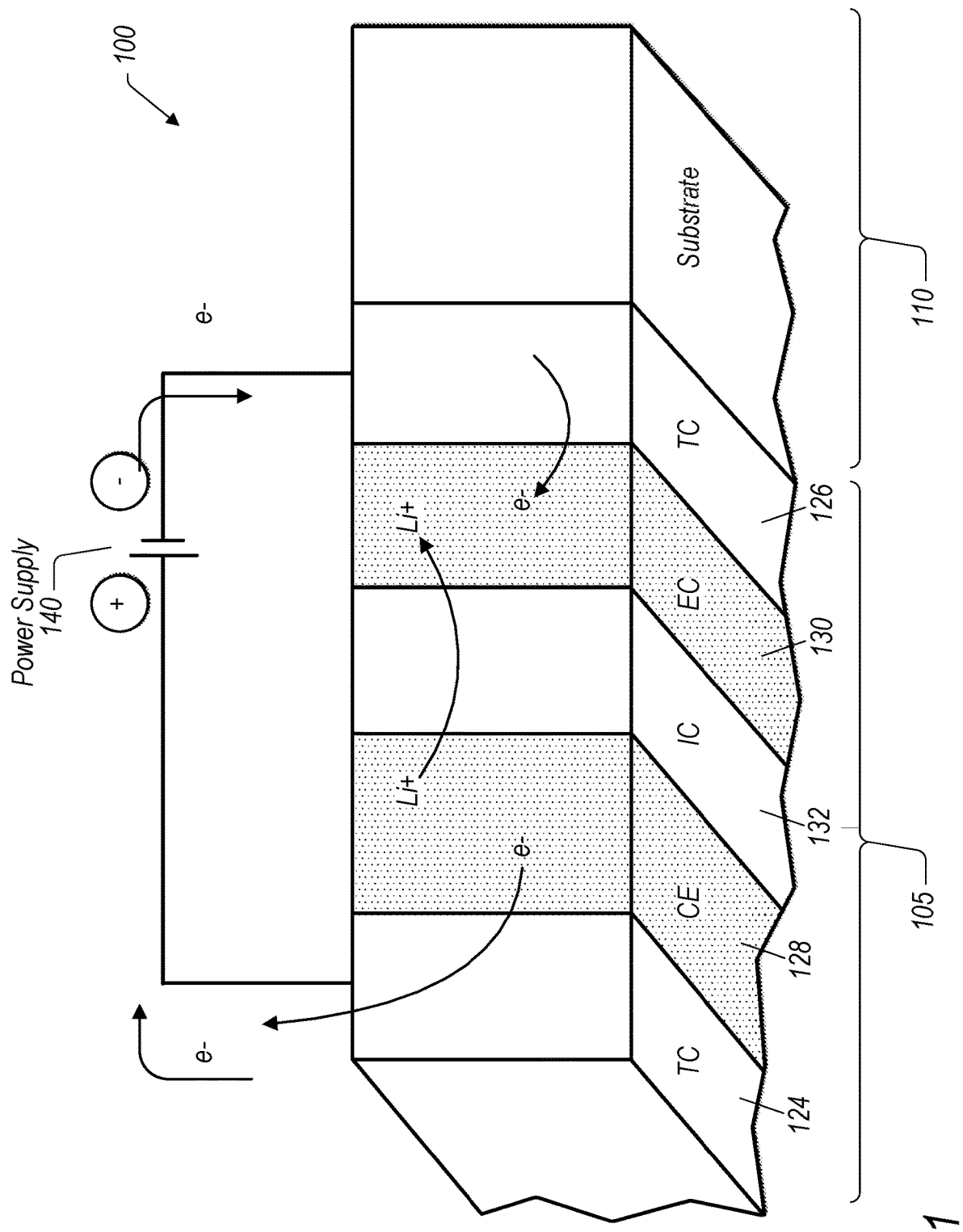
FIG. 1 illustrates an example electrochromic (EC) device according to some aspects.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include,"

"including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

When an electric potential is applied across the layered structure of the electrochromic device, such as by connecting the respective TC, or TCO, layers to a low voltage electrical source, ions, which can include Li+ ions stored in the CE layer, flow from the CE layer, through the IC layer and to the EC layer. In addition, electrons flow from the CE layer, around an external circuit including a low voltage electrical source, to the EC layer so as to maintain charge neutrality in the CE layer and the EC layer. The transfer of ions and electrons to the EC layer causes the optical characteristics of the EC layer, and optionally the CE layer in a complementary EC device, to change, thereby changing the coloration and, thus, the transparency of the electrochromic device.

In some aspects, electric current flowing through the top and bottom transparent conductive oxide (TCO) layers may cause a voltage drop and varying local voltage may result in non-uniform in-plane appearance in electrochromic devices. The non-uniformity may become worse when the top and bottom TCO layers are of different sheet resistances. To limit non-uniformity, sheet resistance differences between two or more sheets may be maintain below a threshold resistance difference. In some aspects, transversal leakage current concentrated at edges of electrochromic devices may provide a lop-sided voltage distribution creating a non-uniform tinting appearance. Such leakage may occur due to natural process/materials variation or special processing at edges such as ablation, selective etching, passivation, laser scribes, lamination, or the like. Non-uniformity may increase when edge leakage increases. To limit non-uniformity, edge leakage may be controlled, for example, in order to have less than a 0.6V local voltage difference at glare control holding states and/or edge leakage should be less than 25% of the max allowed leakage current defined by a performance specifications.

FIG. 1 shows an example electrochromic (EC) system according to some aspect. In this example, electrochromic system 100 may include electrochromic device 105 secured to substrate 110. For instance, electrochromic device 105 may include a thin film which may be deposited on to substrate 110. Electrochromic device 105 may include includes a first transparent conductive (TC) layer 124 and the second TC layer 126 in contact with substrate 110. In some embodiments, TC layer 124 and TC layer 126 may be, or may include transparent conductive oxide (TCO) layers. Substrate 110 may include one or more optically transparent materials, e.g., glass, plastic, and the like. The electrochromic device 120 may also include counter electrode (CE) layer 128 in contact with the first TC layer 124, electrochromic electrode (EC) layer 130 in contact with the second TC layer 126, and ionic conductor (IC) layer 132 "sandwiched" in-between CE layer 128 and EC layer 130. Electrochromic system 100 may include power supply 140 which may provide regulated current or voltage to electrochromic device 105. Transparency of electrochromic device 105 may be controlled by regulating density of charges (or lithium ions) in CE layer 128 and/or EC layer 130 of electrochromic device 105. For instance, when electrochromic system 100 applies a positive voltage from power supply 140 to the first TC 124, lithium ions may be driven across IC layer 132 and inserted into EC layer 130. Simultaneously, charge-compensating electrons may be extracted from CE layer 128, flow across the external circuit, and get inserted into EC layer 130. Transfer of lithium ions and associated electrons from CE layer 128 to EC layer 130 may cause electrochromic device 105 to become darker—e.g., the visible light transmission or % T of electrochromic device 105 may decrease. Reversing the voltage polarity may cause the lithium ions and associated charges to return to their original layer, CE layer 128, and as a result, electrochromic device 105 may return to a clear state—e.g., the visible light transmission or % T of electrochromic device 105 may increase.

In some aspects, electric current flowing through the top and bottom transparent conductive oxide (TCO) layers may cause a voltage drop and varying local voltage may result in non-uniform in-plane appearance in electrochromic devices. The non-uniformity may increase when the top and bottom TCO layers have different sheet resistances. To limit non-uniformity, sheet resistance differences between two or more sheets may be maintain below a threshold resistance difference. In some aspects, transversal leakage current concentrated at edges of electrochromic devices may provide a lop-sided voltage distribution creating a non-uniform tinting appearance. Such leakage may occur due to natural process/materials variation or special processing at edges such as ablation, selective etching, passivation, laser scribes, lamination, or the like. Non-uniformity may increase when edge leakage increases. To limit non-uniformity, edge leakage may be controlled, for example, in order to have less than a 0.6V local voltage difference at glare control holding states and/or edge leakage should be less than 25% of the max allowed leakage current defined by a performance specifications.

In some aspects, tint uniformity of electrochromic device may be improved by controlling a resistivity of the TCO layers. For instance, electric current flowing through the top and bottom transparent conductive oxide (TCO) layers may cause a voltage drop and the varying local voltage may result in non-uniform in-plane appearance in electrochromic devices. The non-uniformity may increase (e.g., become worse) when the top and bottom TCO layers are of different sheet resistances.

In some aspects, an electrochromic device may appear less uniform when the resistance difference between top and bottom TCO becomes larger. Therefore, the sheet resistances may be controlled to limit non-uniformity, e.g. in order to have less than 0.5 V local voltage difference at glare control holding states, TCO sheet resistance difference may be smaller than 0.5 ohm. Uniformity may be the most critical aspect of large-area electrochromic windows for glare control. As material properties usually differs significantly at surfaces, edges and corners, it may be more important for in-pane uniform perception to control the sheet resistance of the TCO layers when there is locally concentrated transversal current, such as laser line leakage at device edges.

Non-uniformity as indicated by maximum local voltage difference versus top and bottom transparent conductive oxide resistance difference in devices with and without concentrated edge leakage. Moreover, the lop-sided voltage distribution induced by mismatched TCO is a potential catalyst of device degradation, because one side of the device can be at higher stack voltages than the degradation threshold. The overvoltage may in turn make the device look less uniform when the leakage increases as a result of degradation. Edge overvoltage may be a function of a top and bottom transparent conductive oxide resistance difference (Rsq,top-Rsq,top). At a certain glare control holding, the lopsided appearance caused by mismatched TCO may become more obvious during transitioning and may cause the devices to switch unevenly and slower due to the exaggerated non-uniform voltage distribution when increased current flowing through the devices that is switching. In some aspects, non-uniformity as indicated by maximum local voltage difference (Vmax-Vmin) versus top and bottom transparent conductive oxide resistance difference (Rsq,top-Rsq,bottom) in a device during transitioning and holding. To ultimately overcome the uniformity issue, top and bottom TCO sheet resistance profile may be configured and adjusted accordingly to yield a location-invariant voltage distribution, and thus, a constantly uniform in-pane perception. Based on theoretical studies and mathematical derivations, the location-invariant voltage distribution may be achieved when the resistances of the top and bottom TCO layers.

The concepts described may be used in the manufacturing process with corresponding in-line mother board control limits for top and bottom sheet resistances. The sheet resistances of top and bottom TCO layers may be measured and monitored separately by in-line electrical tests at intervals (e.g., every 20 mother boards, 4-point-probe measurement at a mono-test). The manufacturing process may be adjusted in real time based on the measured resistance values.

Figure 2:
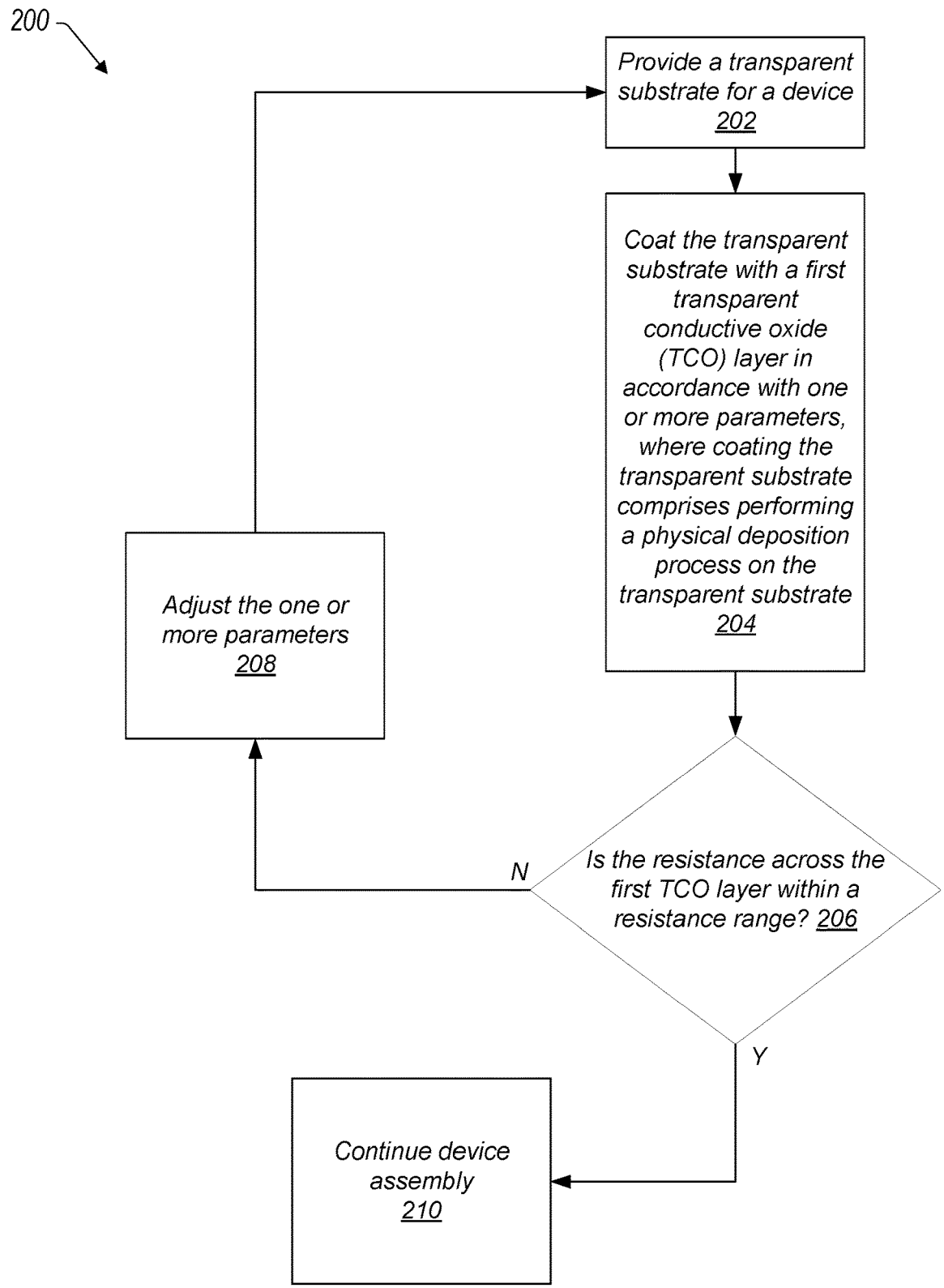
FIG. 2 illustrates an example method for manufacturing a coated glass unit (CGU) according to some aspects.

FIG. 2 illustrates an example method 200 for manufacturing a coated glass unit (CGU) according to some aspects. The method may be performed by one or more systems described herein (e.g., computer system 1000 illustrated in FIG. 10) and may be performed a variety of different types of coated glass units (CGUs) such as a EC device. The method 200 may include one or more same or similar features as the methods described herein and with respect to any FIGS. 3-9. At operation 202, a system may receive a transparent substrate for a device (e.g., a CGU). The transparent substrate may include at least one of a glass, a plastic, or a flexible material. At operation 204, the system may coat the transparent substrate with a first transparent conductive oxide (TCO) layer in accordance with one or more parameters. In some aspects, coating the transparent substrate may include performing a physical deposition process on the transparent substrate. The physical deposition process may include reactive magnetron sputtering. The one or more parameters may include at least one of a TCO sputtering substrate temperature, a TCO sputtering chamber temperature, a TCO sputtering oxygen to argon percentage, a TCO sputtering oxygen and argon gas flow rate, a TCO sputtering power, a TCO sputtering target to substrate distance, a lithium (Li) sputtering power for an ionic conducting (IC) layer of the coated transparent substrate, a post-deposition heat treatment temperature, or the like. At operation 206, the system may determine whether the resistance across the first TCO layer is within a resistance range. For example, the system may perform an electrical resistance test on the first TCO layer and/or estimate the resistance across the first TCO layer using one or more simulations to determine a resistance across the first TCO layer. After determining performing an electrical resistance test on the first TCO layer and/or estimating the resistance across the first TCO layer, the system may determine whether the resistance across the first TCO layer is within a threshold resistance.

When the system determines that the resistance across the first TCO layer is not within the resistance range, then, at operation 208, the system may adjust or provide a recommendation to adjust the one or more parameters. After the one or more parameters are adjusted, the system, at operation 202 may receive another transparent substrate. In some aspects, in response to determining that the resistance across the first TCO layer is not within the resistance range, the substrate and first TCO layer together may be scrapped (e.g., disposed of, thrown away). Alternatively, in response to determining that the resistance across the first TCO layer is not within the resistance range, the substrate and first TCO layer together may be modified or repaired so that the first TCO layer is within the resistance range. When the system determines that the resistance across the first TCO layer is within the resistance range, then, at operation 210, the system may continue assembly may GCU. For example, when the system determines that the resistance across the first TCO layer is within the resistance range, then one or more additional assembly operations (e.g., adding one or more additional layers) may be performed on the device. As another example, when the system determines that the resistance across the first TCO layer is within the resistance range, then one or more packaging operations for shipping may be performed on the device.

In some aspects, the system may determine a resistance across the second TCO layer, determining whether the resistance across the second TCO layer is within the resistance range, and, in response to determining that the resistance across the second TCO layer is within the resistance range, performing at least one of one or more additional manufacturing processes on the coated transparent substrate or a packaging processes on the coated transparent substrate. In some instances, the system, in response to determining that the resistance across the second TCO layer is not within the resistance range, may adjust at least one parameter of the one or more parameters to provide a subsequent TCO layer having a resistance that is within the resistance range.

Figure 3:
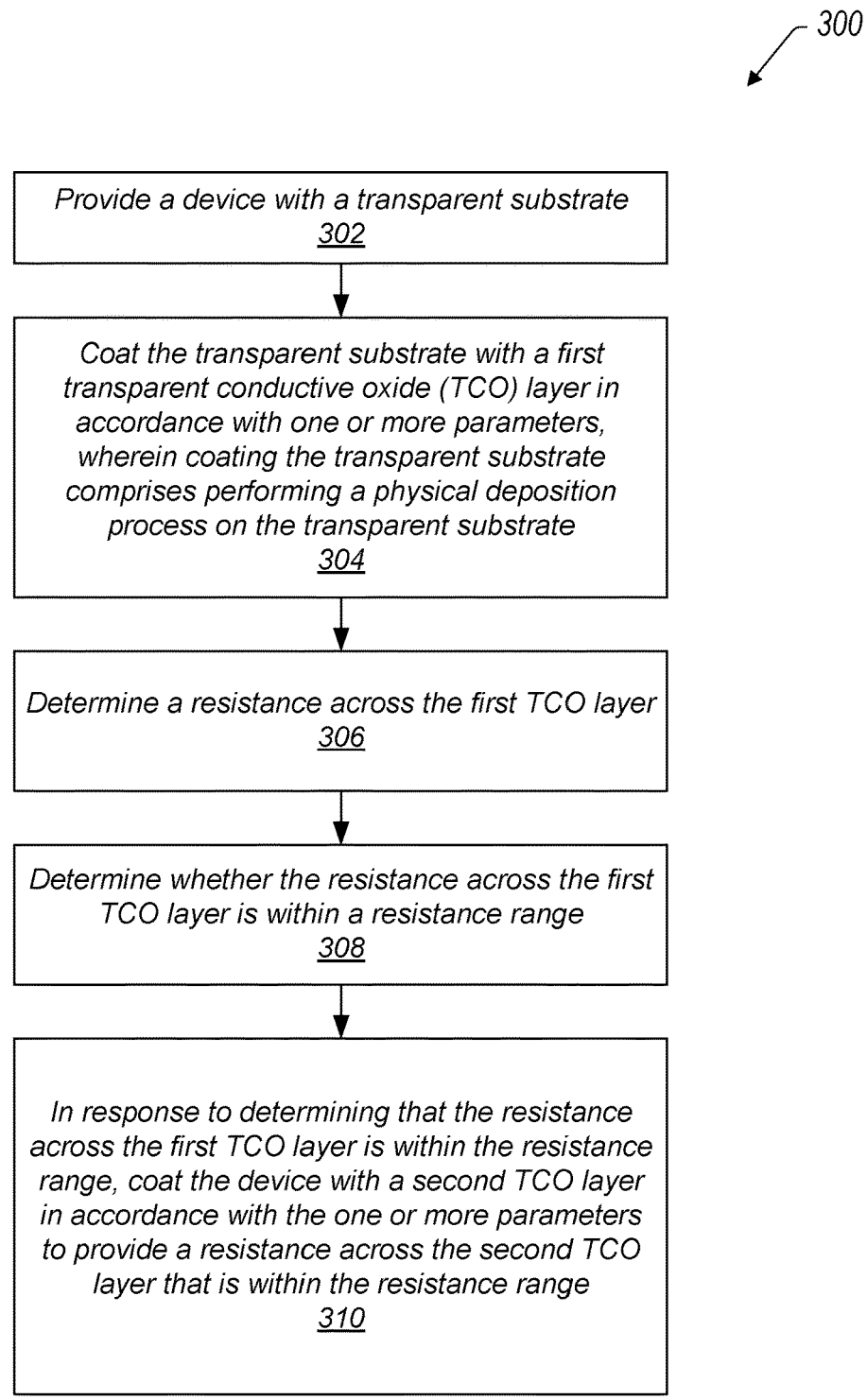
FIG. 3 illustrates an example method for manufacturing a CGU according to some aspects.

FIG. 3 illustrates an example method 300 for manufacturing a coated glass unit (CGU) according to some aspects. The method may be performed by one or more systems described herein (e.g., computer system 1000 illustrated in FIG. 10) and may be performed a variety of different types of coated glass units (CGUs) such as a EC device. The method 300 may include one or more same or similar features as the methods described herein and with respect to any FIGS. 2 and 4-9. At operation 302, a system may receive a device (e.g., a CGU) having a transparent substrate. At operation 304, the system may coat the transparent substrate with a first transparent conductive oxide (TCO) layer in accordance with one or more parameters. In some aspects, coating the transparent substrate may include performing a physical deposition process on the transparent substrate. The physical deposition process may include reactive magnetron sputtering. The one or more parameters may include at least one of a TCO sputtering substrate temperature, a TCO sputtering chamber temperature, a TCO sputtering oxygen to argon percentage, a TCO sputtering oxygen and argon gas flow rate, a TCO sputtering power, a TCO sputtering target to substrate distance, a lithium (Li) sputtering power for an ionic conducting (IC) layer of the coated transparent substrate, a post-deposition heat treatment temperature, or the like. At operation 306, the system may determine a resistance across the first TCO layer. For example, the system may perform an electrical resistance test on the first TCO layer and/or estimate the resistance across the first TCO layer using one or more simulations to determine a resistance across the first TCO layer. At operation 308, the system may determine whether the resistance across the first TCO layer is within a resistance range. At operation 310, in response to determining that the resistance across the first TCO layer is within the resistance range, the system may coat the device with a second TCO layer in accordance with the one or more parameters to provide a resistance across the second TCO layer that is within the resistance range.

Figure 4:
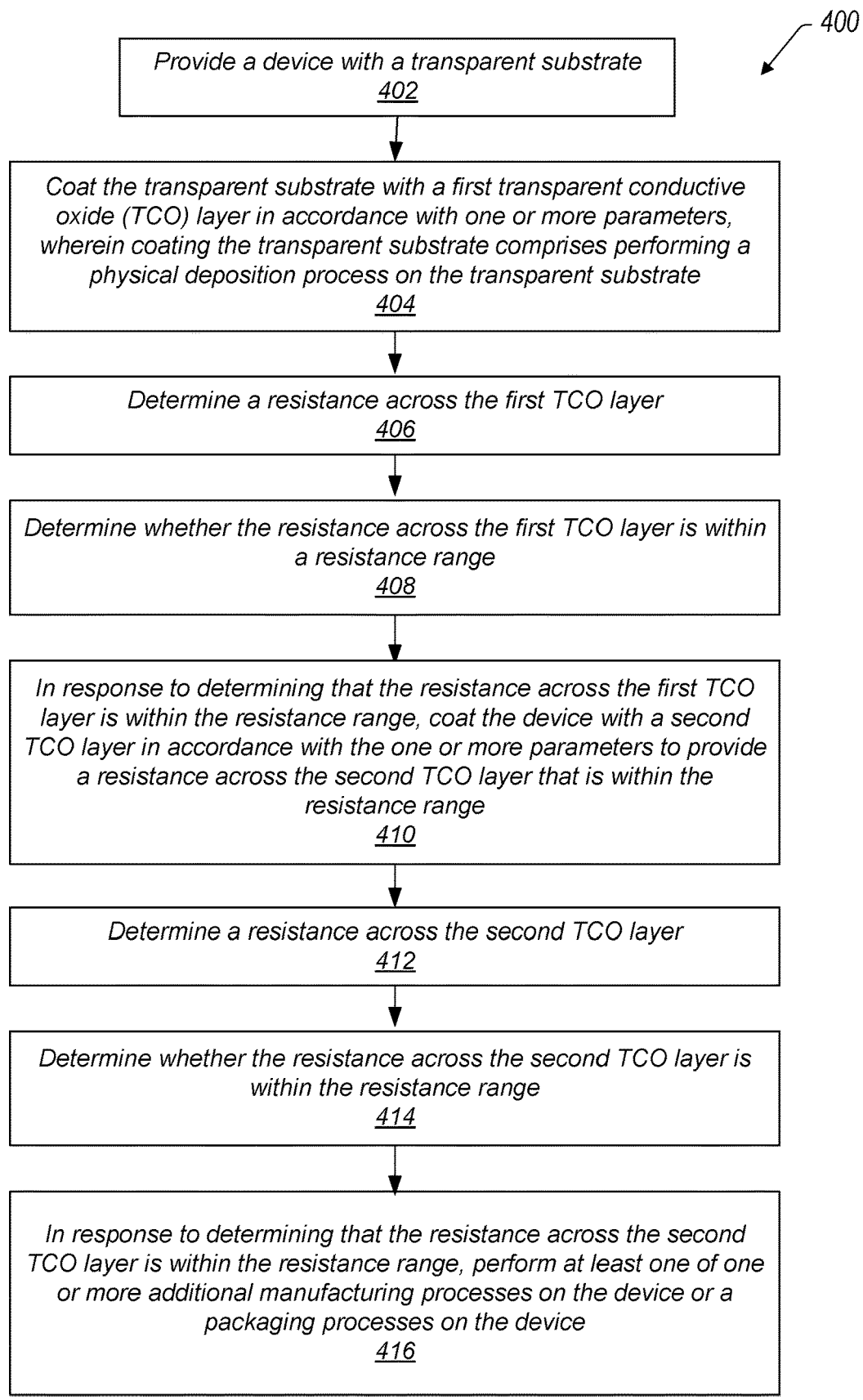
FIG. 4 illustrates an example method for manufacturing a CGU according to some aspects.

FIG. 4 illustrates an example method 400 for manufacturing a coated glass unit (CGU) according to some aspects. The method may be performed by one or more systems described herein (e.g., computer system 900 illustrated in FIG. 9) and may be performed a variety of different types of coated glass units (CGUs) such as a EC device. The method 400 may include one or more same or similar features as the methods described herein and with respect to any FIGS. 2, 3, and 5-9. At operation 402, a system may receive a device (e.g., a CGU) having a transparent substrate. At operation 404, the system may coat the transparent substrate with a first transparent conductive oxide (TCO) layer in accordance with one or more parameters. In some aspects, coating the transparent substrate may include performing a physical deposition process on the transparent substrate. The physical deposition process may include reactive magnetron sputtering. The one or more parameters may include at least one of a TCO sputtering substrate temperature, a TCO sputtering chamber temperature, a TCO sputtering oxygen to argon percentage, a TCO sputtering oxygen and argon gas flow rate, a TCO sputtering power, a TCO sputtering target to substrate distance, a lithium (Li) sputtering power for an ionic conducting (IC) layer of the coated transparent substrate, a post-deposition heat treatment temperature, or the like. At operation 406, the system may determine a resistance across the first TCO layer. At operation 408, the system may determine whether the resistance across the first TCO layer is within a resistance range. For example, the system may perform an electrical resistance test on the first TCO layer and/or estimate the resistance across the first TCO layer using one or more simulations to determine a resistance across the first TCO layer. At operation 410, in response to determining that the resistance across the first TCO layer is within the resistance range, the system may coat the transparent substrate with a second TCO layer in accordance with the one or more parameters to provide a resistance across the second TCO layer that is within the resistance range. At operation 412, the system may determine a resistance across the second TCO layer. For example, the system may perform an electrical resistance test on the second TCO layer and/or estimate the resistance across the second TCO layer using one or more simulations to determine a resistance across the second TCO layer. At operation 414, the system may determine whether the resistance across the second TCO layer is within the resistance range. At operation 416, in response to determining that the resistance across the second TCO layer is within the resistance range, the system may perform at least one of one or more additional manufacturing processes on the device or a packaging process on the device.

Figure 5:
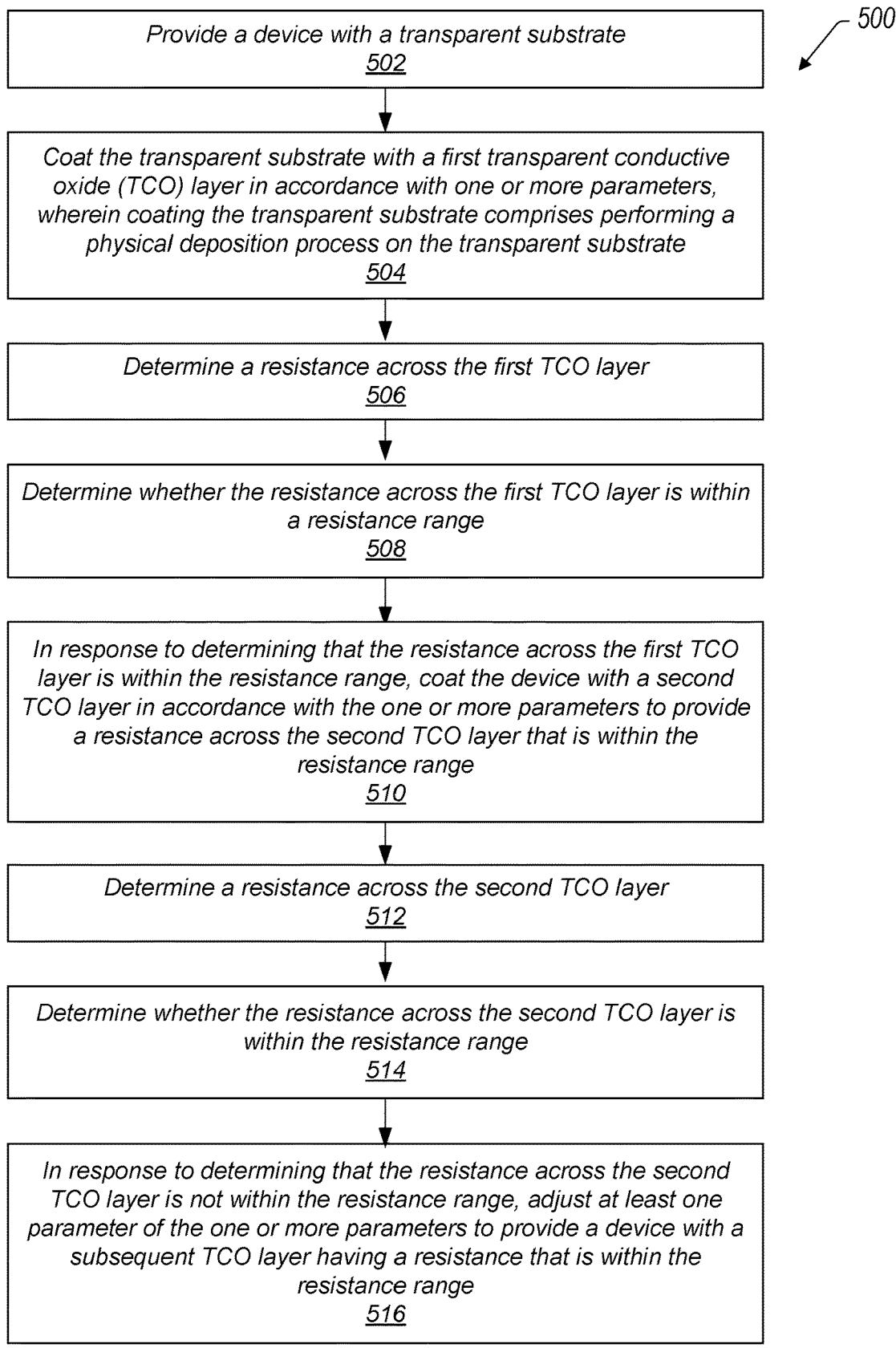
FIG. 5 illustrates an example method for manufacturing a CGU according to some aspects.

FIG. 5 illustrates an example method 500 for manufacturing a coated glass unit (CGU) according to some aspects. The method may be performed by one or more systems described herein (e.g., computer system 1000 illustrated in FIG. 10) and may be performed a variety of different types of coated glass units (CGUs) such as a EC device. The method 500 may include one or more same or similar features as the methods described herein and with respect to any FIGS. 2-4 and 6-9. At operation 502, a system may receive a device (e.g., a CGU) having a transparent substrate. At operation 504, the system may coat the transparent substrate with a first transparent conductive oxide (TCO) layer in accordance with one or more parameters. In some aspects, coating the transparent substrate may include performing a physical deposition process on the transparent substrate. The physical deposition process may include reactive magnetron sputtering. The one or more parameters may include at least one of a TCO sputtering substrate temperature, a TCO sputtering chamber temperature, a TCO sputtering oxygen to argon percentage, a TCO sputtering oxygen and argon gas flow rate, a TCO sputtering power, a TCO sputtering target to substrate distance, a lithium (Li) sputtering power for an ionic conducting (IC) layer of the coated transparent substrate, a post-deposition heat treatment temperature, or the like. At operation 506, the system may determine a resistance across the first TCO layer. For example, the system may perform an electrical resistance test on the first TCO layer and/or estimate the resistance across the first TCO layer using one or more simulations to determine a resistance across the first TCO layer. At operation 508, the system may determine whether the resistance across the first TCO layer is within a resistance range. At operation 510, in response to determining that the resistance across the first TCO layer is within the resistance range, the system may coat the device with a second TCO layer in accordance with the one or more parameters to provide a resistance across the second TCO layer that is within the resistance range. At operation 512, the system may determine a resistance across the second TCO layer. For example, the system may perform an electrical resistance test on the second TCO layer and/or estimate the resistance across the second TCO layer using one or more simulations to determine a resistance across the second TCO layer. At operation 514, the system may determine whether the resistance across the second TCO layer is within the resistance range. At operation 516, in response to determining that the resistance across the second TCO layer is within the resistance range, the system may adjust at least one parameter of the one or more parameters to provide another device with another or subsequent TCO layer having a resistance that is within the resistance range.

Figure 6:
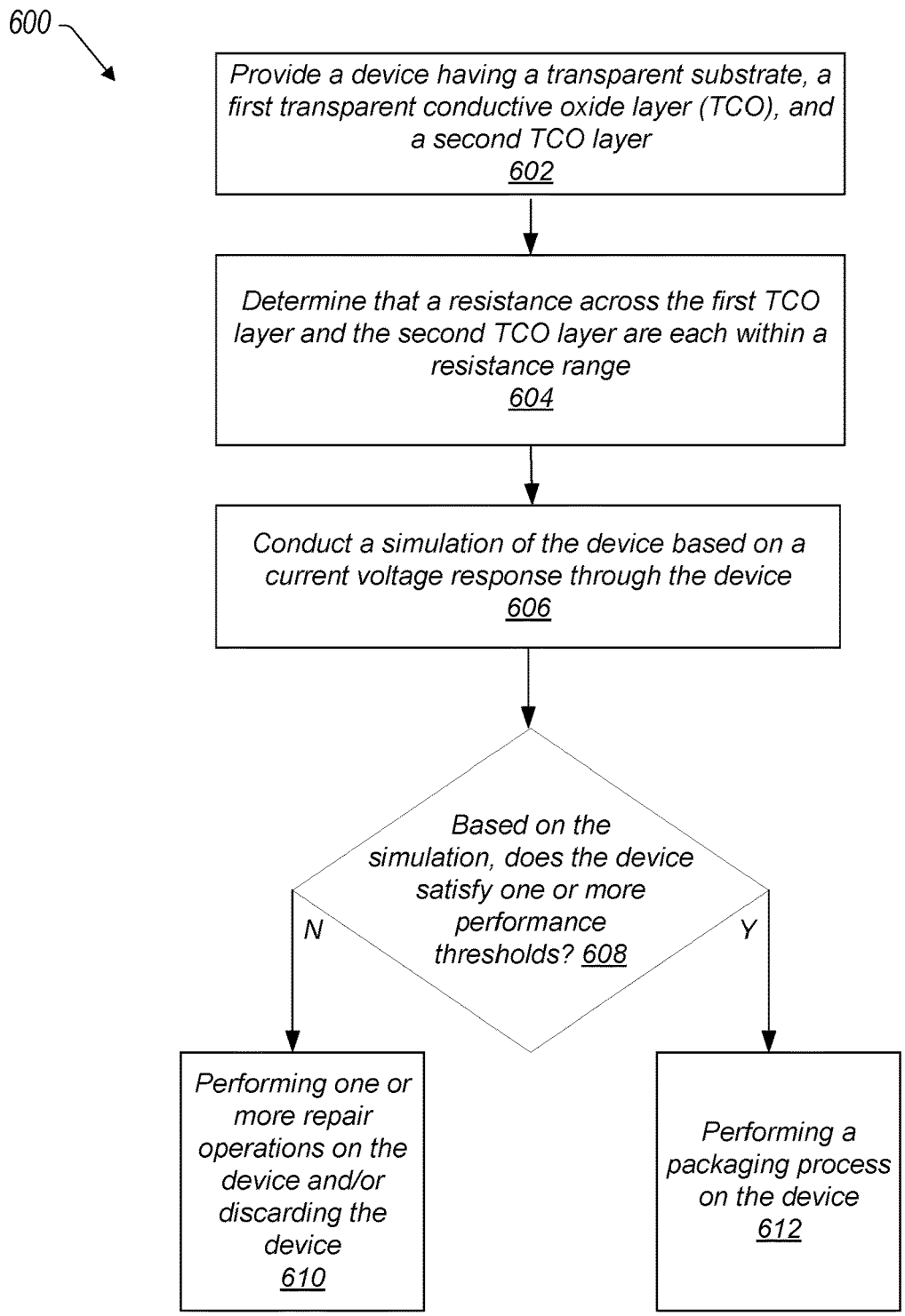
FIG. 6 illustrates an example method for testing performance of a CGU according to some aspects.

FIG. 6 illustrates an example method 600 for testing performance of a coated glass unit (CGU) according to some aspects. The method may be performed by one or more systems described herein (e.g., computer system 1000 illustrated in FIG. 10) and may be performed a variety of different types of coated glass units (CGUs) such as an EC device. The method 600 may include one or more same or similar features as the methods described herein and with respect to any FIGS. 2-5 and 7-9. At operation 602, a system may receive a device (e.g., a CGU) having a transparent substrate, a first transparent conductive oxide (TCO) layer, and a second TCO layer. At operation 604, the system may conduct a quality assurance test. For example, the system may determine that a resistance across the fist TCO layer and a resistance across the second TCO layer are each within a predetermined resistance range. At operation 606, the system may conduct a simulation of the device, for example, using the resistance across the first TCO layer and the resistance across the second TCO layer, based on a current voltage response through the device. In some instances, the simulation may be conducted based on a mapped optical performance of the device including the transparent substrate, the first TCO layer, and the second TCO layer. At operation 608, the system may determine, based on the simulation, whether the device satisfies one or more performance thresholds. When the system determines that the device does not satisfy the one or more performance thresholds, then, at operation 610, the system may perform or may provide a recommendation to perform one or more repair operations on the device. In some aspects, when the system determines that the device does not satisfy the one or more performance thresholds, then, at operation 610, the system may discard the device or may provide a recommendation to discard the device. When the system determines that the device does satisfy the one or more performance thresholds, then, at operation 612, the system may perform or may provide a recommendation to perform one or more packaging operations on the device for shipping the device.

In some instances, the system may, in response to determining, based on the simulation, that the device including the transparent substrate, the first TCO layer, and the second TCO layer does not satisfies the one or more performance thresholds, perform one or more repair operations on at least one of the transparent substrate, the first TCO layer, or the second TCO layer of the device. The one or more repair operations may include at least one cut (e.g., a laser cut) into at least one of the first TCO layer or the second TCO layer. In some aspects, the system may, in response to determining, based on the simulation, that the device including the transparent substrate, the first TCO layer, and the second TCO layer does not satisfies the one or more performance thresholds, discard the device.

Figure 7:
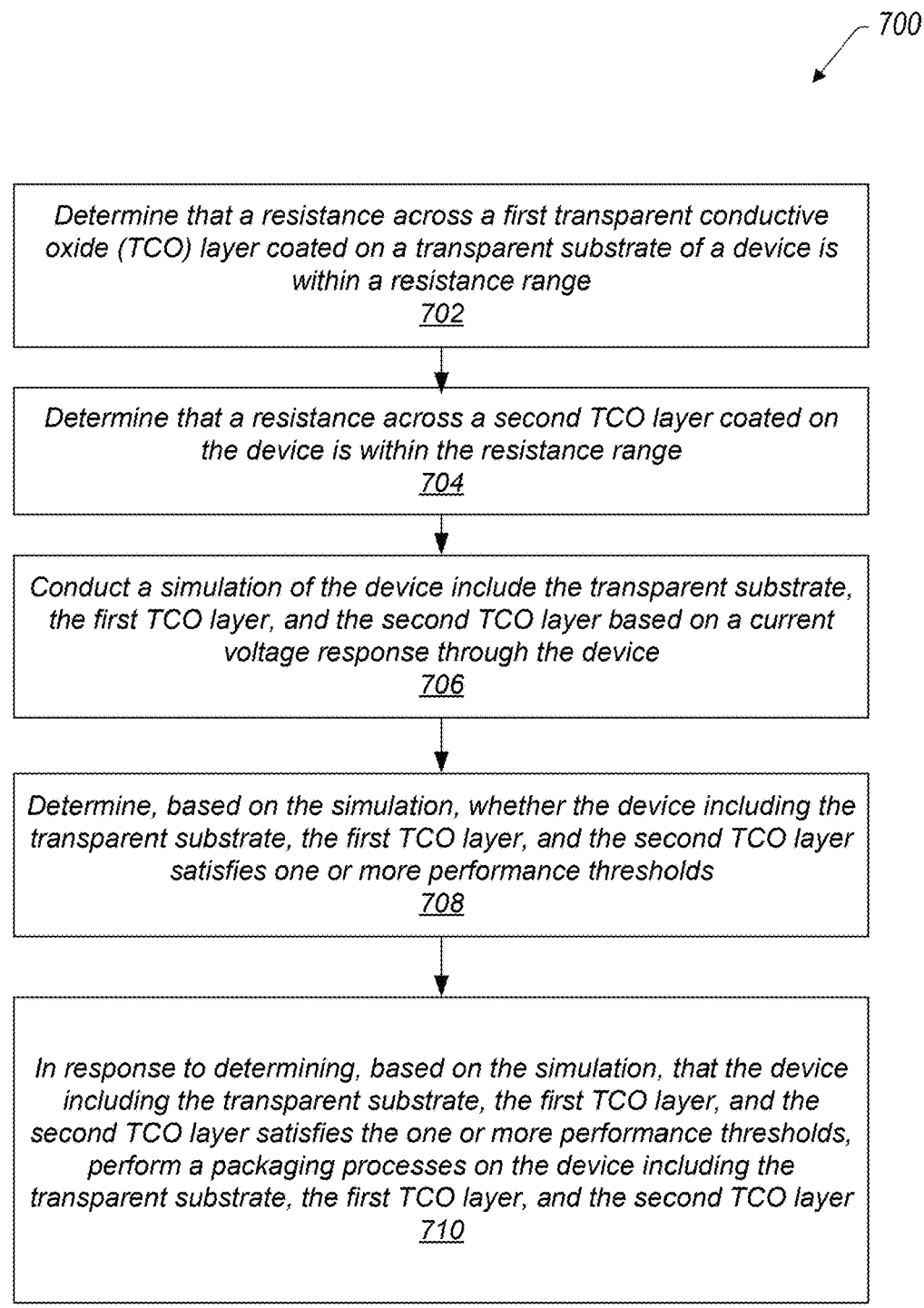
FIG. 7 illustrates an example method for testing performance of a CGU according to some aspects.

FIG. 7 illustrates an example method 700 for testing performance of a CGU according to some aspects. The method may be performed by one or more systems described herein (e.g., computer system 1000 illustrated in FIG. 10) and may be performed a variety of different types of coated glass units (CGUs) such as a EC device. The method 700 may include one or more same or similar features as the methods described herein and with respect to any FIGS. 2-6, 8, and 9. At operation 702, a system may determine that a resistance across a first transparent conductive oxide (TCO) layer coated on a transparent substrate of a device is within a resistance range. At operation 704, the system may determine that a resistance across a second TCO layer coated on the device is within the resistance range. At operation 706, the system may conduct a simulation of the device including the transparent substrate, the first TCO layer, and the second TCO layer based on a current voltage response through the device. In some instances, the simulation may be conducted based on a mapped optical performance of the device including the transparent substrate, the first TCO layer, and the second TCO layer. At operation 708, the system may determine, based on the simulation, whether the device including the transparent substrate, the first TCO layer, and the second TCO layer satisfies one or more performance thresholds. At operation 710, in response to determining, based on the simulation, that the device including the transparent substrate, the first TCO layer, and the second TCO layer satisfies the one or more performance thresholds, perform a packaging processes on the device including the transparent substrate, the first TCO layer, and the second TCO layer.

Figure 8:
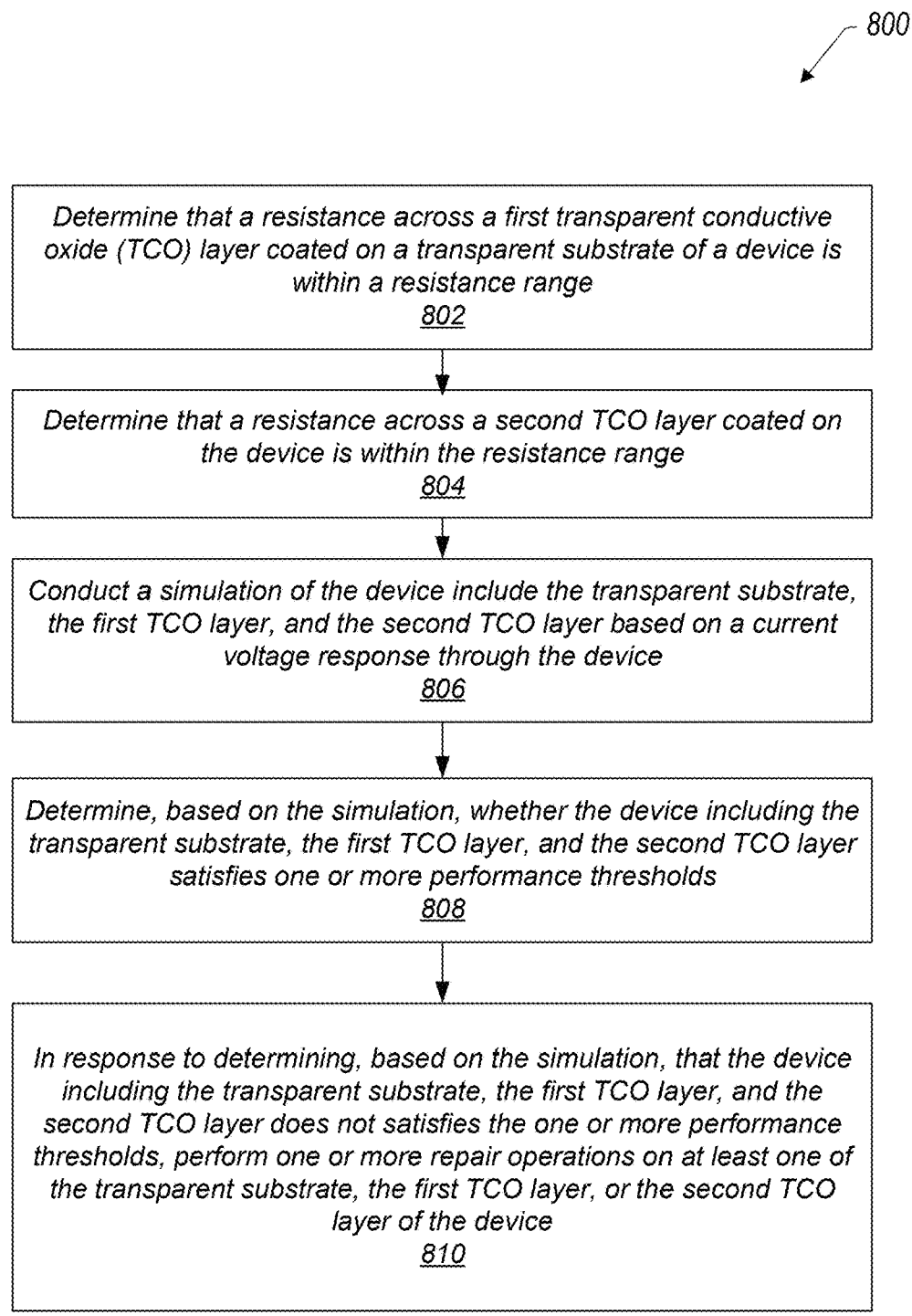
FIG. 8 illustrates an example method for testing performance of a CGU according to some aspects.

FIG. 8 illustrates an example method 800 for testing performance of a CGU according to some aspects. The method may be performed by one or more systems described herein (e.g., computer system 1000 illustrated in FIG. 10) and may be performed a variety of different types of coated glass units (CGUs) such as a EC device. The method 800 may include one or more same or similar features as the methods described herein and with respect to any FIGS. 2-7 and 9. At operation 802, a system may determine that a resistance across a first transparent conductive oxide (TCO) layer coated on a transparent substrate of a device is within a resistance range. At operation 804, the system may determine that a resistance across a second TCO layer coated on the device is within the resistance range. At operation 806, the system may conduct a simulation of the device including the transparent substrate, the first TCO layer, and the second TCO layer based on a current voltage response through the device. In some instances, the simulation may be conducted based on a mapped optical performance of the device including the transparent substrate, the first TCO layer, and the second TCO layer. At operation 808, the system may determine, based on the simulation, whether the device including the transparent substrate, the first TCO layer, and the second TCO layer satisfies one or more performance thresholds. At operation 810, in response to determining, based on the simulation, that the device including the transparent substrate, the first TCO layer, and the second TCO layer does not satisfies the one or more performance thresholds, perform one or more repair operations on at least one of the transparent substrate, the first TCO layer, or the second TCO layer of the device. The one or more repair operations may include at least one cut (e.g., a laser cut) into at least one of the first TCO layer or the second TCO layer.

Figure 9:
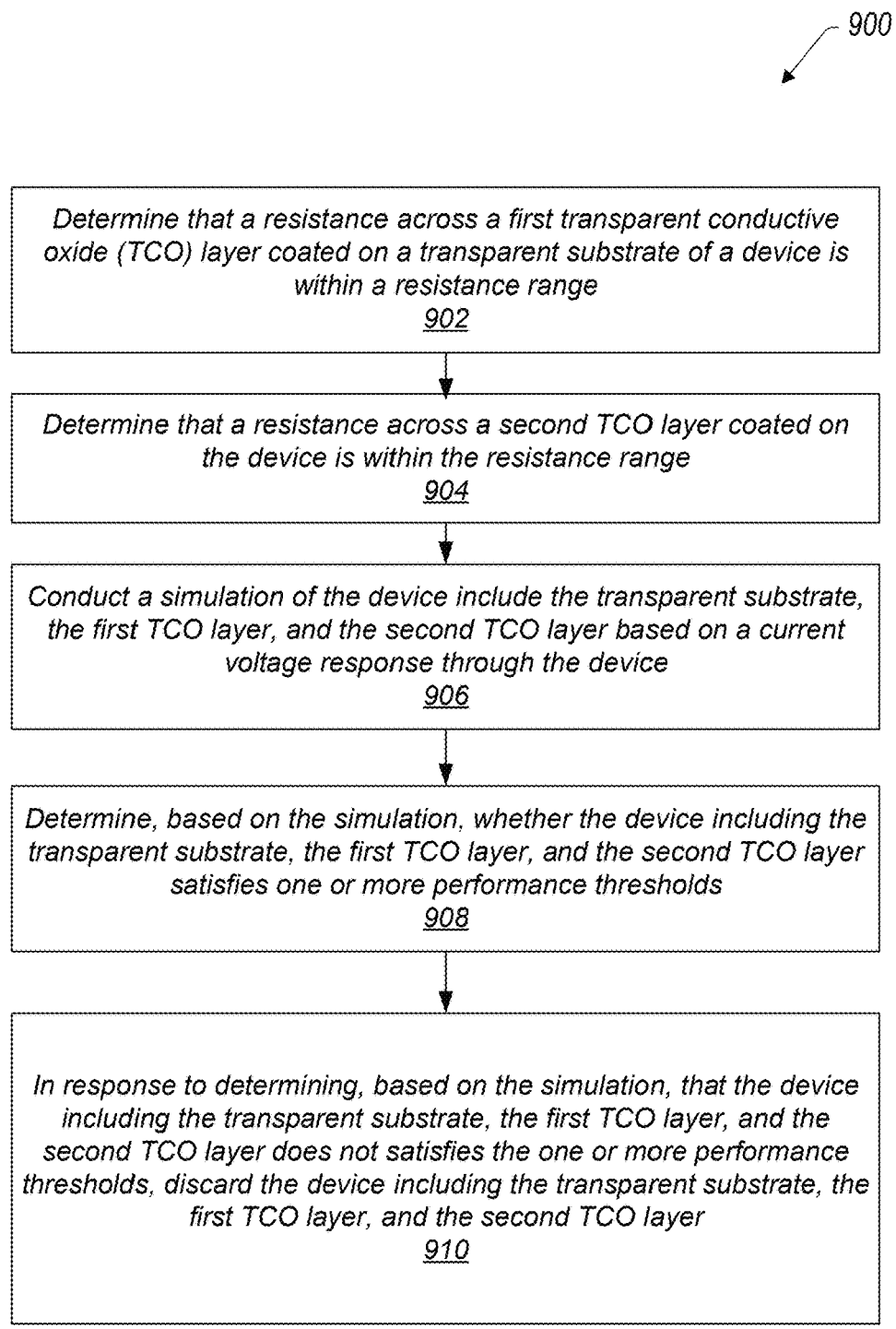
FIG. 9 illustrates an example method for testing performance of a CGU according to some aspects.

FIG. 9 illustrates an example method 900 for testing performance of a CGU according to some aspects. The method may be performed by one or more systems described herein (e.g., computer system 1000 illustrated in FIG. 10) and may be performed a variety of different types of coated glass units (CGUs) such as a EC device. The method 900 may include one or more same or similar features as the methods described herein and with respect to any FIGS. 2-8. At operation 902, a system may determine that a resistance across a first transparent conductive oxide (TCO) layer coated on a transparent substrate of a device is within a resistance range. At operation 904, the system may determine that a resistance across a second TCO layer coated on the device is within the resistance range. At operation 906, the system may conduct a simulation of the device including the transparent substrate, the first TCO layer, and the second TCO layer based on a current voltage response through the device. In some instances, the simulation may be conducted based on a mapped optical performance of the device including the transparent substrate, the first TCO layer, and the second TCO layer. At operation 908, the system may determine, based on the simulation, whether the device including the transparent substrate, the first TCO layer, and the second TCO layer satisfies one or more performance thresholds. At operation 910, in response to determining, based on the simulation, that the device including the transparent substrate, the first TCO layer, and the second TCO layer does not satisfies the one or more performance thresholds, discard the device including the transparent substrate, the first TCO layer, and the second TCO layer.

In some aspects, the concepts described herein may also be used in quality assurance. For example, based on numerical and/or analytical simulation, a sheet resistance control matrix for as-produced devices may be established versus dimensions, transversal current level, and/or performance specifications. Each device may be measured in off-line electrical tests to obtain the sheet resistances of top and bottom TCO layers as well as the transversal current. Based on the dimension, measured transversal current values, and/or performance specifications, pass/fail checks may be made to every device according to the sheet resistance control matrix.

It should be understood that previous concepts have not focused on the control of the sheet resistance difference. In some instances, the total equivalent sheet resistance may be measured and monitored in the produced devices. However, with the same total sheet resistance measured, the resistance of the two TCO layers may differ significantly. Other methods for device uniformity control such as reducing leakage by tuning control parameters or by in-field laser repair are limited ultimately by the presence of mismatched TCO layers. It may be challenging to alter the sheet resistance when the devices have been made into insulated glass units. Therefore, in some aspects, it may be more technically and economically feasible to control the sheet resistance of TCO during production.

Figure 10:
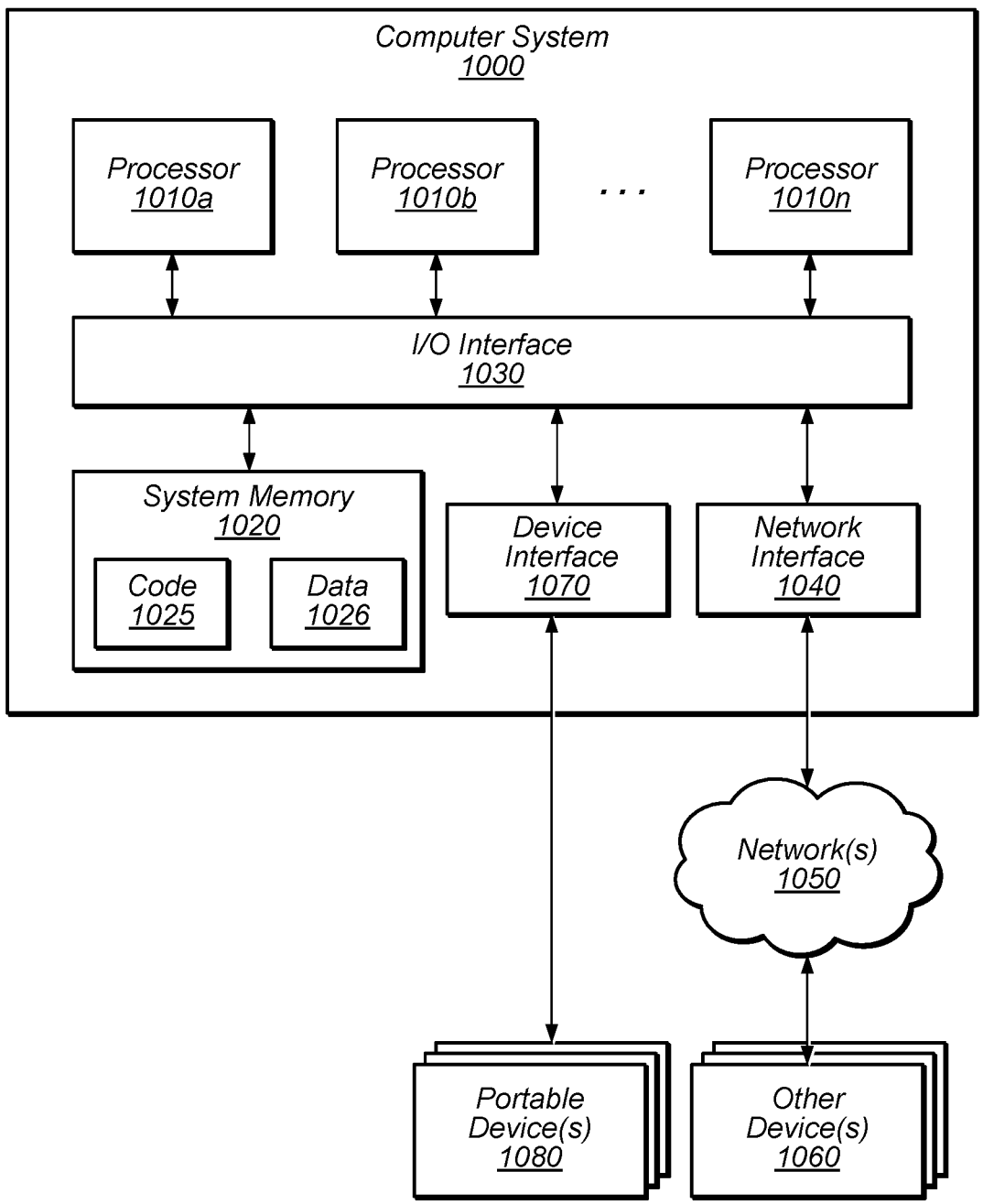
FIG. 10 is a block diagram illustrating a computer system according to some aspects.

FIG. 10 illustrates an example computer system that may be used in some embodiments. The methods, features, mechanisms, techniques and/or functionality described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the methods, features, mechanisms, techniques and/or functionality described herein. The various methods as illustrated in the figures and described herein represent example embodiments of methods. The order of any method may be changed, and various elements may be added, reordered, combined, omitted, modified, etc.

FIG. 10 is a block diagram illustrating a computer system according to some aspects, as well as various other systems, components, services or devices described herein. For example, computer system 1000 may implement a control unit configured to implement and/or utilize the features, methods, mechanisms and/or techniques described herein, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g., Internet, LAN, etc.).

For example, a control unit may receive information and/or commands from one or more other devices requesting that one or more EC devices be changed to a different tint level using the systems, methods and/or techniques described herein. For instance, a user may request a tint change via a portable remote control device (e.g., a remote control), a wall mounted (e.g., hard wired) device, or an application executing on any of various types of devices (e.g., a portable phone, smart phone, tablet and/or desktop computer are just a few examples).

In the illustrated embodiment, computer system 1000 is coupled to one or more portable storage devices 1080 via device interface 1070. In various embodiments, portable storage devices 1080 may correspond to disk drives, tape drives, solid state memory, other storage devices, or any other persistent storage device. Computer system 1000 (or a distributed application or operating system operating thereon) may store instructions and/or data in portable storage devices 1080, as desired, and may retrieve the stored instruction and/or data as needed. In some embodiments, portable device(s) 1080 may store information regarding one or EC devices, such as information regarding design parameters, etc. usable by control unit 320 when changing tint levels using the techniques described herein.

Computer system 1000 includes one or more system memories 1020 that can store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ bytecode, or in any other language such as C/C++, Java™, etc., or in any combination thereof. For example, in the illustrated embodiment, program instructions 1025 include program instructions executable to implement the functionality of a control unit, a stack voltage measurement module, an ESR module, an OCV module, a supervisory control system, local controller, project database, etc., in different embodiments. In some embodiments, program instructions 1025 may implement a control unit configured to implement and/or utilize the features, methods, mechanisms and/or techniques described herein, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g., SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In one embodiment, I/O interface 1030 may coordinate I/O traffic between processor 1010, system memory 1020 and any peripheral devices in the system, including through network interface 1040 or other peripheral interfaces, such as device interface 1070. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1060. In addition, network interface 1040 may allow communication between computer system 1000 and various I/O devices and/or remote storage devices. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method of manufacturing devices having a coated transparent substrate, comprising:
    providing a device having a transparent substrate;
    coating the transparent substrate with a first transparent conductive oxide (TCO) layer in accordance with one or more parameters, wherein coating the transparent substrate comprises performing a physical deposition process on the transparent substrate;
    measuring a resistance across the first TCO layer;
    determining whether the resistance across the first TCO layer is within a resistance range; and
    in response to determining that the resistance across the first TCO layer is not within the resistance range, adjusting the one or more parameters to provide a subsequent TCO layer having a resistance that is within the resistance range.

2. The method of claim 1, wherein the one or more parameters comprises at least one of:
    a TCO sputtering substrate temperature;
    a TCO sputtering chamber temperature;
    a TCO sputtering oxygen to argon percentage;
    a TCO sputtering oxygen and argon gas flow rate;
    a TCO sputtering power;
    a TCO sputtering target to substrate distance;
    an Li sputtering power for an ionic conducting (IC) layer of the coated transparent substrate; or a post-deposition heat treatment temperature.

3. The method of claim 1, wherein determining the resistance across the first TCO layer comprises at least one of performing an electrical resistance test on the first TCO layer or estimating the resistance across the first TCO layer using one or more simulations.

4. The method of claim 1, wherein the transparent substrate comprises at least one of glass, a plastic, or a flexible material.

5. The method of claim 1, wherein the physical deposition process comprises reactive magnetron sputtering.

6. The method of claim 1, further comprising:
in response to determining that the resistance across the first TCO layer is within the resistance range:
coating the device with a second TCO layer in accordance with the one or more parameters to provide a resistance across the second TCO layer that is within the resistance range;
measuring a resistance across the second TCO layer;
determining whether the resistance across the second TCO layer is within the resistance range; and
in response to determining that the resistance across the second TCO layer is within the resistance range, performing at least one of one or more additional manufacturing processes on the coated transparent substrate or a packaging processes on the coated transparent substrate.

7. The method of claim 6, further comprising:
in response to determining that the resistance across the second TCO layer is not within the resistance range, adjusting at least one parameter of the one or more parameters to provide a subsequent TCO layer having a resistance that is within the resistance range.

8. A method of manufacturing a device having a coated transparent substrate, comprising:
providing a device having a transparent substrate;
coating the transparent substrate with a first transparent conductive oxide (TCO) layer in accordance with one or more parameters, wherein coating the transparent substrate comprises performing a physical deposition process on the transparent substrate;
measuring a resistance across the first TCO layer;
determining whether the resistance across the first TCO layer is within a resistance range; and
in response to determining that the resistance across the first TCO layer is not within the resistance range, adjusting at least one parameter of the one or more parameters for providing a subsequent TCO layer of the device having a resistance that is within the resistance range.

9. The method of claim 8, wherein the one or more parameters comprises at least one of:
a TCO sputtering substrate temperature;
a TCO sputtering chamber temperature;
a TCO sputtering oxygen to argon percentage;
a TCO sputtering oxygen and argon gas flow rate;
a TCO sputtering power;
a TCO sputtering target to substrate distance;
an Li sputtering power for an ionic conducting (IC) layer of the coated transparent substrate; or
a post-deposition heat treatment temperature.

10. The method of claim 8, wherein determining the resistance across the first TCO layer comprises at least one of performing an electrical resistance test on the first TCO layer or estimating the resistance across the first TCO layer using one or more simulations.

11. The method of claim 8, wherein the transparent substrate comprises at least one of glass, a plastic, or a flexible material.

12. The method of claim 8, wherein the physical deposition process comprises reactive magnetron sputtering.

13. The method of claim 8, further comprising:
providing another device having a transparent substrate;
coating the other transparent substrate with a first TCO layer in accordance with the one or more parameters including the at least one parameter, as adjusted;
determining a resistance across the first TCO layer;
determining whether the resistance across the first TCO layer of the other transparent substrate is within the resistance range; and
in response to determining that the resistance across the first TCO layer of the other device is within the resistance range, coating the other device with a second TCO layer in accordance with the one or more parameters including the at least one parameter, as adjusted, to provide a resistance across the second TCO layer that is within the resistance range.

14. The method of claim 13, further comprising:
in response to determining that the resistance across the first TCO layer of the other transparent substrate is not within the resistance range, further adjusting at least one parameter of the one or more parameters to provide a subsequent TCO layer having a resistance that is within the resistance range.

15. The method of claim 8, further comprising:
in response to determining that the resistance across the first TCO layer is not within the resistance range, discarding the device having the transparent substrate coated with the first TCO layer.

16. A method for testing performance of a device having a coated transparent substrate, comprising:
measuring that a resistance across a first transparent conductive oxide (TCO) layer coated on a transparent substrate of the device is within a resistance range;
measuring that a resistance across a second TCO layer coated on the device is within the resistance range;
conducting a simulation of the device using the measured resistance across the first TCO layer and the measured resistance across the second TCO layer, based on a current voltage response through the device;
determining, based on the simulation, whether the device including the transparent substrate, the first TCO layer, and the second TCO layer satisfies one or more performance thresholds; and
in response to determining, based on the simulation, that the device including the transparent substrate, the first TCO layer, and the second TCO layer satisfies the one or more performance thresholds, performing a packaging process on the device.

17. The method of claim 16, further comprising:
in response to determining, based on the simulation, that the device including the transparent substrate, the first TCO layer, and the second TCO layer does not satisfies the one or more performance thresholds, performing one or more repair operations on at least one of the transparent substrate, the first TCO layer, or the second TCO layer of the device.

18. The method of claim 17, wherein the one or more repair operations comprises one or more cuts into at least one of the first TCO layer or the second TCO layer.

19. The method of claim 16, further comprising:
in response to determining, based on the simulation, that the device including the transparent substrate, the first TCO layer, and the second TCO layer does not satisfies the one or more performance thresholds, discarding the device.

20. The method of claim 16, wherein the simulation is further conducted based on a mapped optical performance of the device including the transparent substrate, the first TCO layer, and the second TCO layer.

* * * * *